(12) United States Patent
Balasubramanian et al.

(10) Patent No.: US 12,047,925 B2
(45) Date of Patent: Jul. 23, 2024

(54) SUB-BAND FULL-DUPLEX RESOURCE MANAGEMENT FOR SIDELINK

(71) Applicant: QUALCOMM Incorporated, San Diego, CA (US)

(72) Inventors: Anantharaman Balasubramanian, San Diego, CA (US); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 263 days.

(21) Appl. No.: 17/384,871

(22) Filed: Jul. 26, 2021

(65) Prior Publication Data

US 2022/0104198 A1    Mar. 31, 2022

Related U.S. Application Data

(60) Provisional application No. 63/084,137, filed on Sep. 28, 2020.

(51) Int. Cl.
  *H04W 72/04*  (2023.01)
  *H04L 5/14*  (2006.01)
  *H04W 72/0453*  (2023.01)

(52) U.S. Cl.
  CPC ........... *H04W 72/0453* (2013.01); *H04L 5/14* (2013.01)

(58) Field of Classification Search
  None
  See application file for complete search history.

(56) References Cited

U.S. PATENT DOCUMENTS

| 10,225,877 | B2* | 3/2019 | Wakabayashi | H04W 76/11 |
| 2016/0212596 | A1* | 7/2016 | Brahmi | H04W 72/20 |
| 2019/0089502 | A1 | 3/2019 | Yi et al. | |
| 2021/0051673 | A1* | 2/2021 | Chae | H04W 72/23 |
| 2021/0281386 | A1* | 9/2021 | Xia | H04W 72/21 |

FOREIGN PATENT DOCUMENTS

| WO | WO-2016038164 A1 * | 3/2016 | .......... H04W 28/021 |
| WO | WO-2020166037 A1 | 8/2020 | |

OTHER PUBLICATIONS

International Search Report and Written Opinion—PCT/US2021/071015—ISA/EPO—Dec. 6, 2021.
LG Electronics: "Consideration of Flexible and Full Duplex Operation in NR Design", 3GPP Draft, 3GPP TSG RAN WG1 Meeting #85, R1-164562 NR FDR V1, 3rd Generation Partnership Project (3GPP), Mobile Competence Centre, 650, Route Des Lucioles, F-06921 Sophia-Antipolis Cedex, France, vol. RAN WG1, No. Nanjing, China, May 23, 2016-May 27, 2016 May 14, 2016 (May 14, 2016), XP051096377, 4 Pages, Retrieved from the Internet: URL: http://www.3gpp.org/ftp/tsg_ran/WG1_RL1/TSGR1_85/Docs/ [retrieved on May 14, 2016] Subclause 4 Full-Duplex Capability in UE.

* cited by examiner

*Primary Examiner* — Eunsook Choi
(74) *Attorney, Agent, or Firm* — Patterson + Sheridan, LLP

(57) ABSTRACT

Certain aspects of the present disclosure provide techniques for sub-band full-duplex resource management for sidelink. A method that may be performed by a user equipment first (UE) includes transmitting, to a second UE, information indicating one or more resource assignments for one or more transmissions to the second UE and communicating with the second UE in a full-duplex manner based on the one or more resource assignments.

28 Claims, 9 Drawing Sheets

SUB-BAND FULL-DUPLEX RESOURCE MANAGEMENT FOR SIDELINK

CROSS REFERENCE TO RELATED APPLICATION

This application hereby claims priority under 35 U.S.C. § 119 to U.S. Provisional Patent Application No. 63/084,137, filed on Sep. 28, 2020, the contents of which are incorporated herein in their entirety.

BACKGROUND

Field of the Disclosure

Aspects of the present disclosure relate to wireless communications, and more particularly, to techniques for sub-band full duplex resource management for sidelink communications.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include desirable spectral efficiency, data rates, and/or latencies on sidelink communications.

Certain aspects of the subject matter described in this disclosure can be implemented in a method for wireless communication by a first user equipment (UE). The method generally includes transmitting, to a second UE, information indicating one or more resource assignments for one or more transmissions to the second UE, and communicating with the second UE in a full-duplex manner based on the one or more resource assignments.

Certain aspects of the subject matter described in this disclosure can be implemented in a method for wireless communications by a first UE. The method generally includes receiving, from a second UE, information indicating one or more resource assignments for one or more transmissions from the second UE, and communicating with the second UE in a full-duplex manner based on the one or more resource assignments.

Certain aspects of the subject matter described in this disclosure can be implemented in a first user equipment (UE). The first UE generally includes means for transmitting, to a second UE, information indicating one or more resource assignments for one or more transmissions to the second UE; and means for communicating with the second UE in a full-duplex manner based on the one or more resource assignments.

Certain aspects of the subject matter described in this disclosure can be implemented in a first user equipment (UE). The first UE generally includes means for receiving, from a second UE, information indicating one or more resource assignments for one or more transmissions from the second UE; and means for communicating with the second UE in a full-duplex manner based on the one or more resource assignments.

Certain aspects of the subject matter described in this disclosure can be implemented in a first user equipment (UE). The first UE generally includes a transceiver configured to transmit, to a second UE, information indicating one or more resource assignments for one or more transmissions to the second UE, and communicate with the second UE in a full-duplex manner based on the one or more resource assignments.

Certain aspects of the subject matter described in this disclosure can be implemented in a first user equipment (UE). The first UE generally includes a transceiver configured to receive, from a second UE, information indicating one or more resource assignments for one or more transmissions from the second UE, and communicate with the second UE in a full-duplex manner based on the one or more resource assignments.

Certain aspects of the subject matter described in this disclosure can be implemented in an apparatus for wireless communications by a first UE. The apparatus generally includes an interface configured to, output for transmission a second UE, information indicating one or more resource assignments for one or more transmissions to the second UE; and a processing system configured to communicate with the second UE in a full-duplex manner based on the one or more resource assignments.

Certain aspects of the subject matter described in this disclosure can be implemented in an apparatus for wireless communications by a first UE. The apparatus generally includes an interface configured to obtain, from a second UE, information indicating one or more resource assignments for one or more transmissions from the second UE; and a processing system configured to communicate with the second UE in a full-duplex manner based on the one or more resource assignments.

Certain aspects of the subject matter described in this disclosure can be implemented in a computer-readable medium for wireless communications by a first UE. The computer-readable medium generally includes codes executable to output, for transmission a second UE, information indicating one or more resource assignments for one or more transmissions to the second UE, and communicate with the second UE in a full-duplex manner based on the one or more resource assignments.

Certain aspects of the subject matter described in this disclosure can be implemented in a computer-readable medium for wireless communications by a first UE. The computer-readable medium generally includes codes executable to obtain, from a second UE, information indicating one or more resource assignments for one or more transmissions from the second UE, and communicate with the second UE in a full-duplex manner based on the one or more resource assignments.

Aspects of the present disclosure provide UEs, means for, apparatuses, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
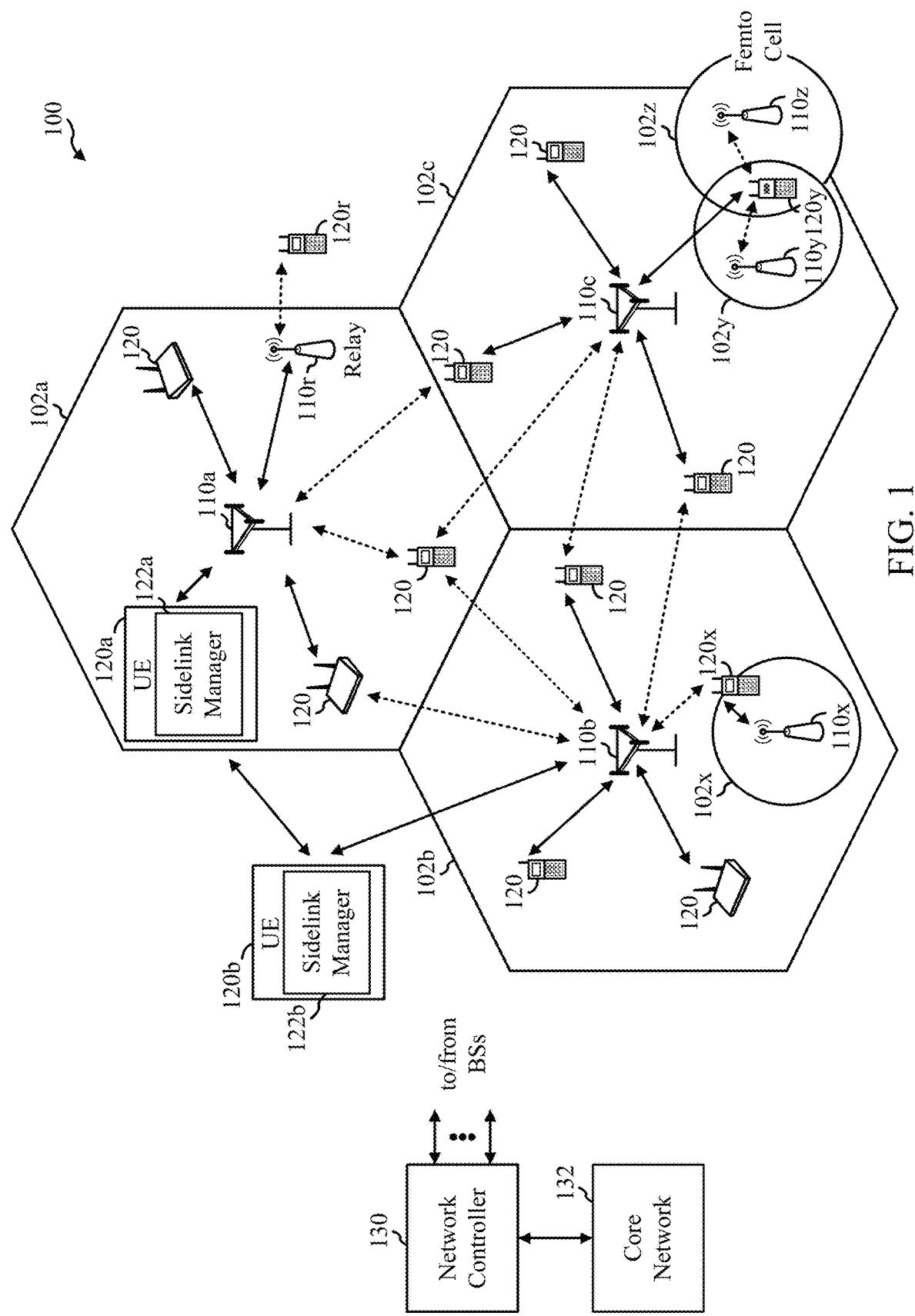
FIG. 1 is a block diagram conceptually illustrating an example wireless communication network, in accordance with certain aspects of the present disclosure.

Aspects of the present disclosure provide apparatus, methods, processing systems, and computer readable mediums for sub-band full-duplex resource management on sidelink communications. The resource management described herein may enable a user equipment to perform resource selection to communicate with another UE in a full-duplex manner. In aspects, the resource management described herein may provide signaling and procedures to enable the coexistence between half-duplex UEs and full-duplex UEs. As an example, a first UE, which is full-duplex capable, may provide one or more second UEs, which may be full-duplex capable, with the receive resources that the first UE can use to perform reception simultaneously with transmissions to the second UEs. In certain cases, the receive resources may be indicated explicitly or implicitly with the resource reservations for transmissions from the first UE to the second UEs at future occasions. The second UEs may perform resource selection based on the receive resources indicated by the first UE. In aspects, the first UE can indicate explicitly or implicitly the receive resources suitable for full-duplex communication based on the current resources used for transmission and the resources reserved at a future occasion.

The resource management described herein may enable simultaneous transmission/reception of sidelink communications on a sub-band basis in a dynamic or semi-static manner. In certain aspects, the resource management described herein may enable desirable spectral efficiency, data rates, and/or latencies for sidelink communications due to the simultaneous transmission/reception of sidelink communications.

The following description provides examples of resource management in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported, as multi-layer transmissions. Aggregation of multiple cells may be supported.

FIG. 1 illustrates an example wireless communication network 100 in which aspects of the present disclosure may be performed. For example, the wireless communication network 100 may be an NR system (e.g., a 5G NR network).

As shown, the UE 120a includes a sidelink manager 122a that provides information indicating one or more resource assignments for sidelink transmissions to the UE 120b and communicates with the UE 120b based on the resource assignment, in accordance with aspects of the present disclosure. The UE 120b includes a sidelink manager 122b that obtains the resource assignments from the UE 120a, identifies frequency resources for transmissions to the UE 120a based on the resource assignment and/or other criteria or metrics, and communicates with the UE 120a based on the resource assignment, in accordance with aspects of the present disclosure.

Various sidelink channels may be used for sidelink communications, including a physical sidelink discovery channel (PSDCH), a physical sidelink broadcast channel (PSBCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSBCH may carry information related to synchronization such as the direct frame number (DFN), indication of the slot and symbol level time resources for sidelink transmissions, in-coverage indicator, etc. The PSCCH may carry control signaling such as sidelink resource configurations and other parameters used for data transmissions. The PSSCH may carry data transmissions, and the PSFCH may carry feedback such as hybrid automatic repeat request (HARD) feedback and/or channel state information related to a sidelink channel quality.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
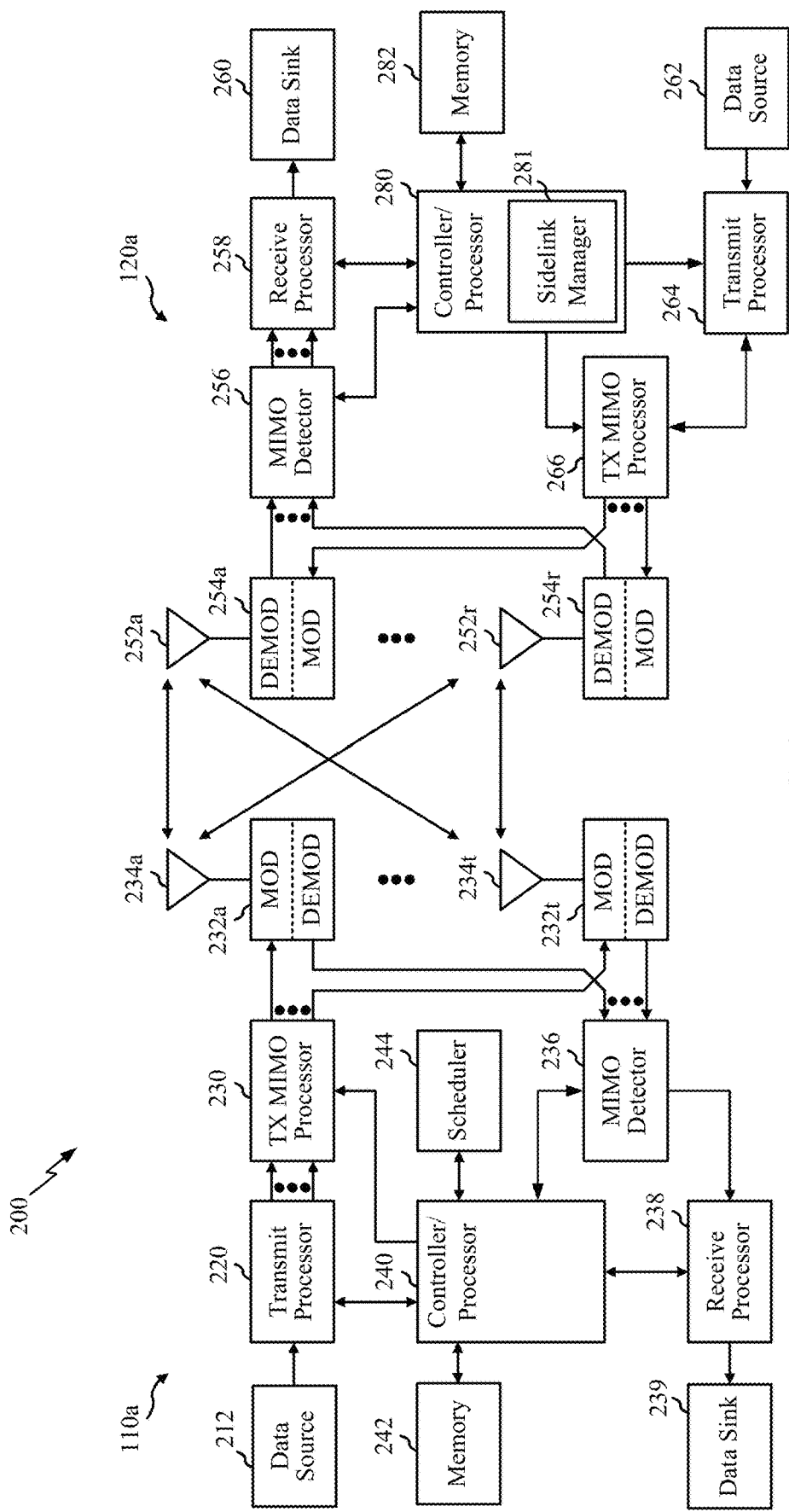
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has a sidelink manager 281 that provides information indicating one or more resource assignments for sidelink transmissions to another UE, obtains resource assignments from the other UE, identifies frequency resources for transmissions to the other UE based on the resource assignment and/or other criteria or metrics, and/or communicates with the other UE based on the resource assignment, according to aspects described herein. Although shown at the controller/processor, other components of the UE 120a and BS 110a may be used to perform the operations described herein.

While the UE 120a is described with respect to FIGS. 1 and 2 as communicating with a BS and/or within a network, the UE 120a may be configured to communicate directly with/transmit directly to another UE 120, or with/to another wireless communication device without relaying communications through a network. In some embodiments, the BS 110a illustrated in FIG. 2 and described above is an example of another UE 120. In one aspect, communicating includes transmitting data, receiving data or both transmitting and receiving. In another aspect, communicating includes outputting, e.g. data, for transmission, obtaining, e.g. other data, or both outputting and obtaining.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
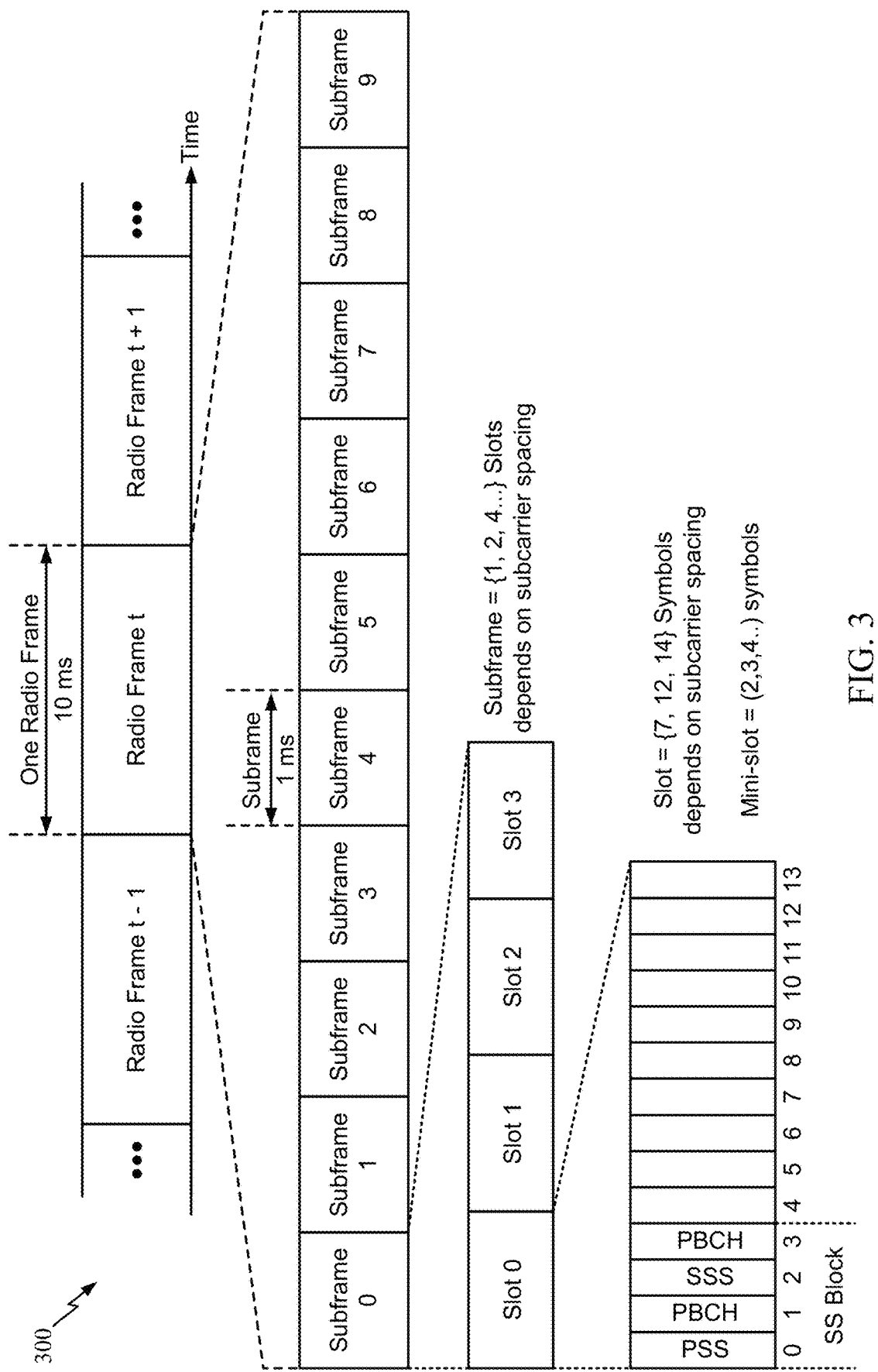
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Figure 4:
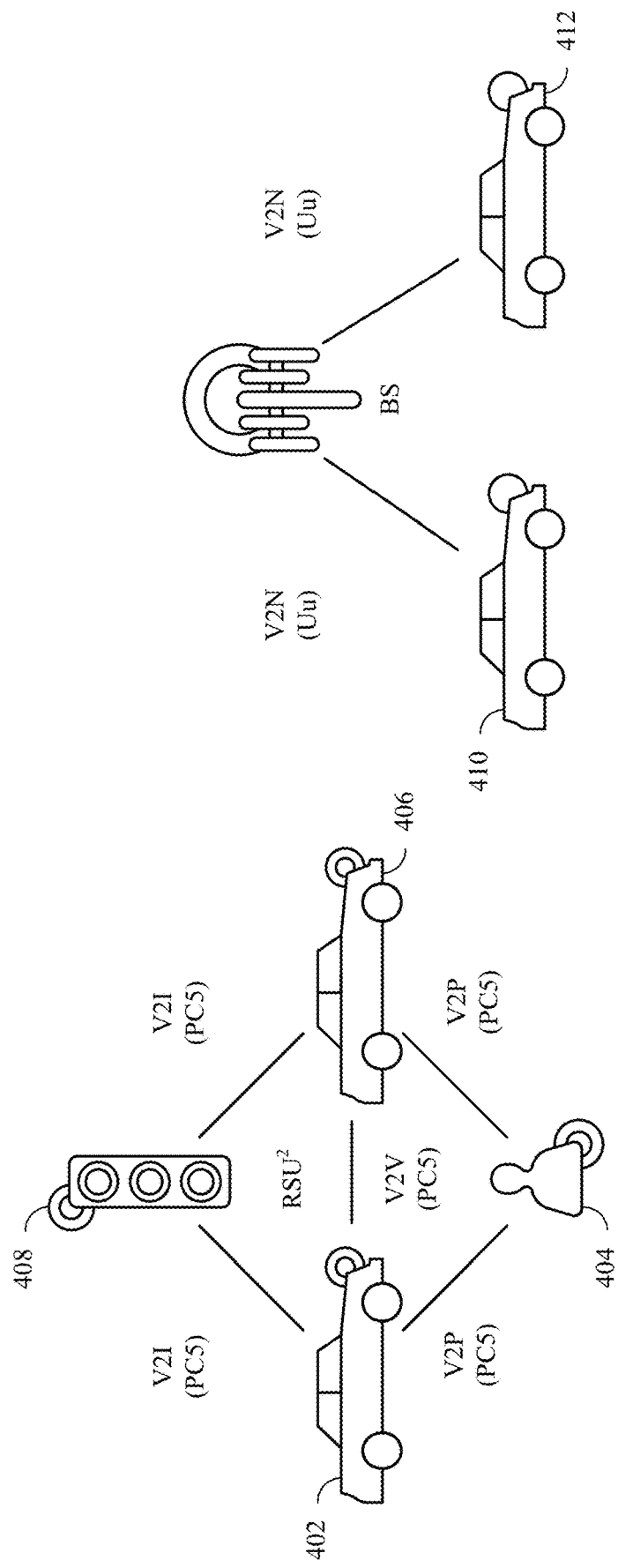
FIGS. 4A and 4B illustrate vehicle to everything (V2X) systems, in accordance with certain aspects of the present disclosure.

FIGS. 4A and 4B illustrate vehicle to everything (V2X) systems, in accordance with certain aspects of the present disclosure. The V2X systems, provided in FIGS. 4A and 4B provides two complementary transmission modes. A first transmission mode involves direct communications (e.g., also referred to herein as sidelink communications between UEs) between participants in the local area. Such communications are illustrated in FIG. 4A. A second transmission mode involves network communications through a network as illustrated in FIG. 4B, which may be implemented over a Uu interface (e.g., a wireless communication interface between a radio access network (RAN) and a UE).

Referring to FIG. 4A, a V2X system is illustrated with two vehicles. The first transmission mode allows for direct communication between different participants in a given geographic location. As illustrated, a first vehicle 402 can have a wireless communication link with an individual 404 (V2P) (e.g., via a UE) through a PC5 interface. Communications between the first vehicle 402 and a second vehicle 406 (V2V) may also occur through a PC5 interface. In a like manner, communication may occur from the first vehicle 402 to a roadside unit (RSU) 408, such as a traffic signal or sign (V2I) through a PC5 interface. In each example illustrated, two-way communication may take place between elements, therefore each element may be a transmitter and a receiver of information. In the configuration provided, the first transmission mode is a self-managed system and no network assistance is provided. Such transmission modes may enable improved spectral efficiency, reduced cost, and increased reliability as network service interruptions do not occur during handover operations for moving vehicles. Resource assignments do not need coordination between operators and subscription to a network is not necessary, therefore there is reduced complexity for such self-managed systems. The V2X system may be configured to operate in a licensed or unlicensed spectrum, thus any vehicle with an equipped system may access a common frequency and share information. Such harmonized/common spectrum operations allows for safe operation. The V2X system Referring to FIG. 4B, a second of two complementary transmission modes is illustrated. In the illustrated embodiment, a vehicle 410 may communicate to another vehicle 412 through network communications. These network communications may occur through discrete nodes, such as a BS (e.g., an eNB or gNB), that send and receive information between vehicles. The network communications may be used, for example, for long range communications between the vehicles (410, 412), such as noting the presence of an accident approximately 1 mile ahead. Other types of communication may be sent by the node to the vehicles (410, 412), such as traffic flow conditions, road hazard warnings, environmental/weather reports, service station availability and other like data. Such data can be obtained from cloud-based sharing services.

Example Sub-Band Full-Duplex Resource Management for Sidelink

In certain wireless communication systems (e.g., 5G NR) a UE may communicate directly with one or more other UEs via sidelink channels in a half-duplex manner. That is, a UE may communicate with another UE in one direction at a time. For example, the UE may transmit, to the other UE, data at a first occasion and receive, from the other UE, data at a second occasion. For example, a resource reservation at a future occasion may be explicitly signaled by a first UE to a second UE in sidelink control information (SCI). The second UE may avoid the reserved resources as well as the resource in which the second UE receives the resource reservation for choosing resources to transmit to the first UE. In aspects, the half-duplex communications supported for sidelink transmissions may provide undesirable spectral efficiency, data rates, and/or latencies.

Aspects of the present disclosure provide sub-band full-duplex resource management for sidelink communications. In aspects, the resource management described herein may provide signaling and procedures to enable the coexistence between half-duplex UEs and full-duplex UEs. The resource management described herein may enable a UE to perform resource selection to communicate with another UE in a full-duplex manner. As an example, a first UE, which is full-duplex capable, may provide one or more second UEs, which may be full-duplex capable, with the receive resources that the first UE can use to perform reception simultaneously with transmissions to the second UEs. In certain cases, the receive resources may be indicated explicitly or implicitly with the resource reservations for transmissions from the first UE to the second UEs at future occasions. The second UEs may perform resource selection based on the resource reservations indicated by the first UE. In aspects, the first UE may indicate explicitly or implicitly the receive resources available for full-duplex transmission from the second UE to the first UE. In certain aspects, the second UE may obtain a configuration, such as a frequency offset, to derive the receive resources based on the resource reservations.

The resource management described herein may enable simultaneous transmission/reception of sidelink communications on a sub-band basis in a dynamic or semi-static manner. As used herein, a sub-band full duplex (SBFD) system may refer to a wireless communication system where some UEs are able to concurrently perform transmission and reception in separate sub-bands or sub-channels within one or more carriers. In certain aspects, the resource management described herein may enable desirable data rates and/or latencies for sidelink communications due to the simultaneous transmission/reception of sidelink communications.

Figure 5:
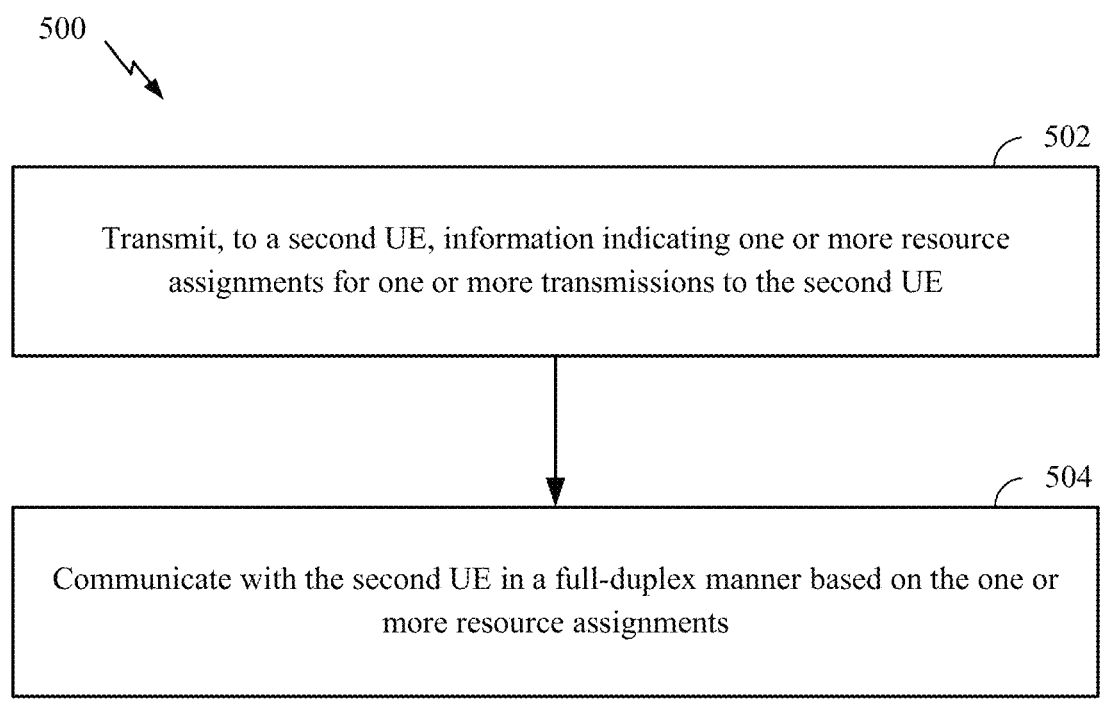
FIG. 5 is a flow diagram illustrating example operations for wireless communication by a UE, in accordance with certain aspects of the present disclosure.

FIG. 5 is a flow diagram illustrating example operations 500 for wireless communication, in accordance with certain aspects of the present disclosure. The operations 500 may be performed, for example, by a UE (e.g., the UE 120a in the wireless communication network 100). The operations 500 may be implemented as software components that are executed and run on one or more processors (e.g., controller/processor 280 of FIG. 2). Further, the transmission and reception of signals by the UE in the operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting (or providing) signals.

The operations 500 may begin, at 502, where a first UE may transmit, to a second UE (e.g., the UE 120b), information indicating one or more resource assignments for one or more transmissions to the second UE. At 504, the first UE may communicate with the second UE in a full-duplex manner based on the one or more resource assignments.

In aspects, the resource assignments at 502 may include a frequency resource assignment, a time resource assignment, and/or a resource reservation period. The frequency resource assignment may include one or more frequency resources for the transmissions from the first UE to the second UE, and the resource allocation unit in the frequency domain may be in terms of one or more resource blocks, one or more bandwidth part (BWPs) in a carrier, or one or more sub-channels in a BWP or carrier. As used herein, a sub-channel may refer to a specific number of contiguous resource blocks in a BWP or carrier, such as 10, 15, 20, 25, 50, 75, or 100 contiguous resource blocks. The time resource assignment may include one or more time-domain resources for the transmission from the first UE to the second UE, and the resource allocation unit in the time domain may be in terms of symbols, mini-slots, slots, etc. The resource reservation period may provide a periodicity with which the frequency-time resources are assigned, for example, a length of the period (e.g., in milliseconds) and a total number of periods for future transmission occasions.

The full-duplex communications at 504 may involve the first UE communicating directly with the second UE via various sidelink channels. In aspects, the communications at 504 may involve the first UE receiving from and transmitting to the second UE various signals simultaneously. For example, the communication with the second UE may include the first UE receiving, from the second UE, one or more first signals at one or more first frequency locations and at one or more first reception occasions. The first UE may transmit, to the second UE, one or more second signals at one or more second frequency locations and at one or more second transmission occasions, where at least one of the one or more first reception occasions overlaps with the one or more second transmission occasions.

In certain aspects, the first and second frequency locations may refer to specific resource blocks at which respective sub-channels begin or end, such as a first sub-channel beginning at the first frequency location, and a second sub-channel beginning at the second frequency location. The first UE may transmit the first signals via the first sub-channel and receive the second signals via the second sub-channel. The first sub-channel may or may not overlap with the second sub-channel.

In certain aspects, the information may explicitly or implicitly indicate frequency resources that can and/or cannot be used for full-duplex transmissions from the second UE to the first UE. For example, the first UE may transmit the information with an explicit indication of the frequency resources that can or cannot be included in performing full-duplex transmissions from the second UE to the first UE. In one example, the resources that are to be excluded for full-duplex communications may be signaled explicitly as $\{s_1, s_2, \ldots s_n\}$, where each $s_i$ represent one or more physical resource blocks, sub-channels, BWPs, etc. The excluded resources may indicate that the first UE cannot perform concurrent reception using these resources while the first UE is concurrently transmitting to the second UE using frequency resources indicated in the resource assignments. Additionally, or alternatively, the information may indicate the frequency resources in which the first UE is able to perform full-duplex reception.

As an example of an explicit indication of full-duplex frequency resources, the information at 502 may include an indication of one or more first frequency resources that can be used for full-duplex transmissions from the second UE to the first UE. The communication with the second UE at 504 may include the first UE receiving one or more signals from the second UE via the indicated one or more first frequency resources. In certain cases, the indication of the one or more frequency resources comprises a frequency offset relative to a reference frequency. In aspects, the reference frequency may be associated with one or more second frequency resources indicated in the one or more resource assignments, as further described herein.

As an example of an explicit indication of frequency resources to exclude from full-duplex communications, the information at 502 may include an indication of one or more first frequency resources that cannot be used for full-duplex transmissions from the second UE to the first UE. The communication with the second UE at 504 may include the first UE receiving one or more signals from the second UE via one or more second frequency resources that are different from the one or more first frequency resources.

In certain aspects, the frequency resources that can or cannot be used for full-duplex transmissions may be valid for a specific duration. For example, the frequency resources to be excluded/included for performing full-duplex reception at the first UE may be valid starting from the first transmission occasion indicated in the resource assignment at 502 for a specific duration. In certain cases, the specific duration may be preconfigured among the first UE and second UE or included in the information. In certain cases, the frequency resources that can or cannot be used for full-duplex transmissions may be valid from the first transmission occasion indicated in the resource until the last transmission occasion in the resource assignment. In other words, the specific duration for the full-duplex resources used for transmissions from the first UE to the second UE may be valid for the same time period associated with the resource assignments at 502. As an example, the first UE may receive signals from the second UE for a time period, which may be pre-configured, indicated in the information or other messaging, or associated with the resource assignments. That is, the reception of signals may occur during the time period, which may be pre-configured, indicated in the information or other messaging or associated with the resource assignments.

In certain aspects, the first UE may consider various factors or metrics in determining the frequency resources that can or cannot be used for full-duplex transmissions from the second UE. For example, the first UE may consider its full-duplex capabilities, such as its self-interference cancellation capabilities, its number of antennas, a guard band separation between transmission/reception resources, etc. In certain cases, the first UE may consider the channel quality of various sub-channels in a resource pool allocated for sidelink communications. For example, the first UE may select sub-channels with relatively low interference from other UEs.

Suppose the first UE is aware of the frequency resources that the first UE will use for transmissions in the next T slots. Let $\{a_1, a_2 \ldots a_m\}$ be the frequency resources that will be used transmit various signals to the second UE. The frequency resources $\{a_1, a_2 \ldots a_m\}$ may include the resources reserved for future transmission occasions.

In certain scenarios, the first UE may be aware of its capability in terms of the frequency isolation required between transmit and receive sub-channels (e.g., in order to avoid transmit power leakage into the receive sub-channels). For example, the first UE may be capable of having one sub-channel of isolation (separation) between the transmit and receive sub-channels. In certain cases, the first UE may have two sub-channels of isolation between the transmit and receive sub-channels. For example, a guard band may separate the sub-channels used for transmit/receive full-duplex communications. Generally, the guard band may separate the resource assignments from the frequency resources available for full-duplex transmission to the first UE. In aspects, the guard band may include one or more resource blocks, sub-channels, or BWPs. Based on the transmit frequency resources $\{a_1, a_2 \ldots a_m\}$, the first UE may derive the receive frequency resource $\{s_1, s_2, \ldots s_n\}$ and/or the frequency resources to exclude from full-duplex communications. In other words, the frequency resources to exclude from full-duplex communications may include the guard band separating the transmit/receive sub-channels.

In certain cases, the first UE may consider the channel quality in addition to or alternatively to the aforementioned guard band in deriving the receive frequency resources for full-duplex communications. In certain aspects, the channel quality may be determined based on a channel busy ratio (CBR), a channel quality indicator, signal-to-noise ratio (SNR), signal-to-interference plus noise ratio (SINR), signal-to-noise plus distortion ratio (SNDR), and/or a received signal strength indicator (RSSI). As an example, the RSSI may be measured on each of the sub-channels $\{s_1, s_2, \ldots s_n\}$ deemed be to available for full-duplex transmissions taking into account the full-duplex capabilities of the first UE, such as the transmit leakage criterion (e.g., isolation region or guard band between transmit/receive sub-channels). If the RSSI of a specific sub-channel ($s_i$) is less than or equal to a given threshold (e.g., $s_i \leq THR$) for consecutive N slots (where N could be preconfigured or associated with the resource assignments), the first UE may select the specific sub-channel $s_i$ as a part of a receive capable resource for full-duplex transmissions from the second UE and indicate as such to the second UE.

As an example, the operations 500 may further involve the first UE identifying the frequency resources that can or cannot be used for full-duplex transmission from the second UE based on the first UE capabilities and/or the channel quality. For example, the first UE may identify one or more frequency resources (e.g., resources that can or cannot be used for full-duplex transmissions) based on at least one of a full-duplex capability of the first UE or a channel quality associated with a plurality of frequency resources including the one or more frequency resources. In aspects, the transmission of the information at 502 may include the first UE transmitting the information based on the identified frequency resources.

In certain aspects, the frequency resources that can be used for full-duplex transmission from the second UE to the first UE may be indicated or determined by a frequency offset relative to a specific reference frequency or a specific frequency resource. In aspects, the n full-duplex exclusion/inclusion resources $\{s_1, s_2, \ldots s_n\}$ may be related to the m resources $\{a_1, a_2, \ldots a_m\}$ indicated in the resource assignments at 502, for example, by the frequency offset.

In certain scenarios, there may be a relationship (such as a frequency offset) between a UE's transmit sub-channels (including future transmission occasions) and the receive resources available for full-duplex transmission. For example, if the first UE transmits the resource assignments with frequency resources $\{a_1, a_2, \ldots a_m\}$, the resource assignment may imply that frequency resources $\{a_1+x_1, a_2+x_2, \ldots a_m+x_m\}$ are deemed to be available for reception at the first UE. In other words, the second UE may be aware of one or more frequency offsets relative to the resource assignments, and the frequency offsets can be used to identify frequency resources available for full-duplex transmissions to the first UE.

The frequency offset may be indicated via downlink control information (DCI), SCI, RRC signaling, MAC signaling, and/or system information from a UE (e.g., the first UE) or a base station. In certain aspects, the frequency offset may be relative to a reference frequency, such as a frequency location within a carrier (e.g., the first frequency resource in the carrier) or a frequency location in the resource assignments (e.g., the first frequency resource in the resource assignments). In aspects, the reference frequency may associated with the frequency resources indicated in the resource assignments.

In certain cases, the frequency offset may be represented by a bit indicator (b) to denote the mapping between the transmit and reception resources. The bit indicator may be a bitmap or binary field that provides a mapping to one or more frequency offsets. For example, a resource assignment with frequency resources $\{a_1, a_2, \ldots a_m\}$ and $b=b_1$ may indicate that the frequency resources $\{a_1+x_1, a_2+x_2, \ldots +x_m\}$ are available for full-duplex transmission to the first UE, whereas a resource assignment with $b=b_2$ may indicate that the frequency resources $\{a_1+y_1, a_2+y_2, \ldots +y_m\}$ are available for full-duplex transmission to the first UE. In aspects, the bit indicator may be provided to the second UE with the information at 502 or via separate signaling, such as DCI, SCI, RRC signaling, MAC signaling, and/or system information. In certain aspects, the bit indicator may be pre-configured at the second UE.

In certain aspects, the frequency resources that can be used for full-duplex transmissions from the second UE to the first UE may be pre-configured or indicated via various explicit signaling, such as capability information of the first UE, dynamic signaling, or a semi-static signaling. As an example, the first UE may obtain a configuration indicating one or more frequency resources that can be used for full-duplex transmissions from the second UE to the first UE, and the first UE may receive one or more signals from the second UE via the one or more frequency resources.

In certain cases, the first UE may provide separate signaling, dynamic or semi-static signaling, to the second UE that indicates the frequency resources that can or cannot be used for full-duplex transmissions from the second UE to the first UE. For example, the first UE may transmit, to the second UE, an indication of a frequency offset, where the frequency offset indicates one or more first frequency resources that can be used for full-duplex transmissions from the second UE to the first UE relative to a reference frequency such that the one or more first frequency resources are spaced from the reference frequency by the frequency offset. The reference frequency may be a frequency location within a carrier (e.g., the first frequency resource in the carrier) or a frequency location in the resource assignments (e.g., the first frequency resource in the resource assignments). The first UE may receive one or more signals from the second UE via the one or more first frequency resources.

In certain cases, the first UE may provide capability information to the second UE that indicates the frequency resources that can or cannot be used for full-duplex transmissions from the second UE to the first UE. In certain scenarios, the number of frequency resources available for full-duplex transmission to the first UE may depend on the full-duplex capabilities of the first UE (such as the number of receive antennas or the availability of transmit/receive points (TRPs)), which may be signaled to the second UE by the first UE. For example, the first UE may transmit, to the second UE, an indication of a full-duplex capability of the first UE, where the full-duplex capability indicates one or more frequency resources that can be used for full-duplex transmissions from the second UE to the first UE. The first UE may receive one or more signals from the second UE via the one or more frequency resources. In certain aspects, the full-duplex capability includes one or more antennas available for full-duplex communications, and the second UE may be able to derive the location of the frequency resources available for full-duplex transmissions based on the full-duplex capabilities of the first UE.

An implicit indication of the full-duplex resources may be based on capability information of the first UE sent to the second UE or a specific frequency offset obtained by the second UE. For example, the second UE may identify the frequency resources that can or cannot be used for full-duplex transmissions from the second UE to the first UE based on a frequency offset relative to the resource assignments. The frequency offset may be derived from the capability information provided by the first UE. In certain cases, the frequency offset may be preconfigured at the second UE or provided by the first UE.

In certain aspects, the information transmitted at 502 may be conveyed via various sidelink messages, such as sidelink system information, radio resource control (RRC) signaling, sidelink control information (SCI), or medium access control (MAC) signaling (e.g., a MAC-control element). For example, the information at 502 may include SCI. In certain aspects, the indication of the frequency resources that can/cannot be used for full-duplex transmissions from the second UE to the first UE may be conveyed via various sidelink messages, such as sidelink system information, RRC signaling, SCI, or MAC signaling.

Figure 6:
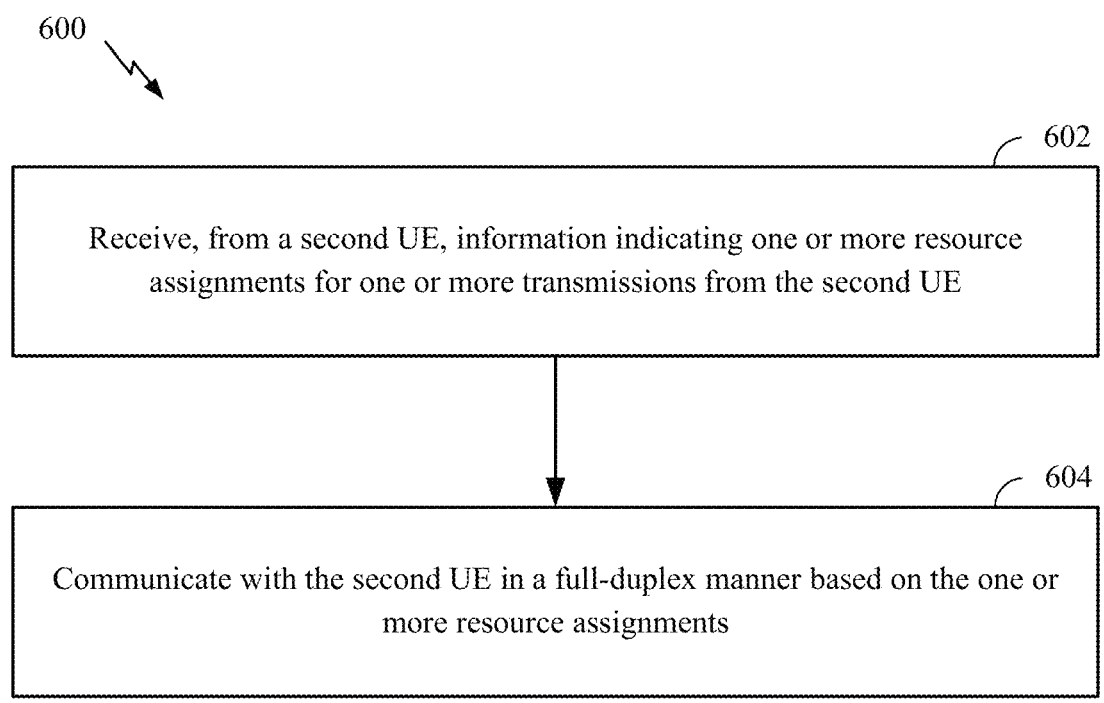
FIG. 6 is a flow diagram illustrating example operations for wireless communication by a UE, in accordance with certain aspects of the present disclosure.

FIG. 6 is a flow diagram illustrating example operations 600 for wireless communication, in accordance with certain aspects of the present disclosure. The operations 600 may be performed, for example, by a UE (e.g., the UE 120b in the wireless communication network 100). The operations 600 may be complementary to the operations 500 performed by another UE. The operations 600 may be implemented as software components that are executed and run on one or more processors (e.g., controller/processor 280 of FIG. 2). Further, the transmission and reception of signals by the UE in the operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting (or providing) signals.

The operations 600 may begin, at 602, where a first UE (e.g., the UE 120b) may receive, from a second UE (e.g., the UE 120a), information indicating one or more resource assignments for one or more transmissions from the second UE. At 604, the first UE may communicate with the second UE in a full-duplex manner based on the one or more resource assignments.

In certain aspects, the first UE of the operations 600 may select frequency resources for full-duplex transmission to the second UE from a resource pool based on the information received at 602 and channel qualities of the resources. For example, the first UE may receive the information implicitly or explicitly indicating the frequency resources that can or cannot be used for full-duplex transmissions to the second UE (e.g., the frequency resources $\{s_1, s_2, \ldots s_n\}$). The first UE may perform channel quality measurements on a plurality of resources in a resource pool allocated for sidelink communications. In aspects, the channel quality may be determined based on a CBR, a channel quality indicator, SNR, SINR, SNDR, and/or a RSSI. For example, suppose $\{c_1, c_2, \ldots c_i\}$ represents the candidate set resource (CSR) selected from the resource pool based on the channel quality. For example, $\{c_1, c_2, \ldots c_i\}$ might be the CSR that have an RSSI in the lowest 20% of the all the resources sensed in the resource pool. In other words, the first UE may select the frequency resources from the frequency pool with a channel quality less than or equal to a specific threshold (e.g., RSSI of $\{c_1, c_2, \ldots c_i\} \leq$ threshold), where the threshold may be associated with a certain number or percentage of the resources with the best channel quality (e.g., lowest RSSI or CBR) within the resource pool. In certain aspects, alternative or additional thresholds may be used to select the frequency resources from the resource pool. The first UE may then select at least a portion of the resources from $\{c_1, c_2, \ldots c_i\}$ that overlap with $\{s_1, s_2, \ldots s_n\}$. For example, $\{f_1, f_2, \ldots, f_j\}$ may be the j resources that satisfies this condition. The first UE may perform transmissions to the second UE at 604 in these j resources.

In cases, where the first UE is communicating with multiple second UEs at 604, the first UE may select the frequency resources as indicated by the second UEs that overlap with the resources with the best channel quality (e.g., lowest RSSI or CBR). For example, the first UE may identify the resources that overlap between the receive resources indicated by the second UEs and the CSR resources that has the lowest 20% RSSI.

As an example, the first UE may identify one or more frequency resources that can or cannot be used for full-duplex transmissions from the first UE to the second UE based on at least one of the one or more resource assignments or a channel quality associated with the one or more frequency resources. At 604, the first UE may transmit one or more signals to the second UE via the one or more frequency resources. The identification of the one or more frequency resources may include identifying the one or more frequency resources having the channel quality less than or equal to a threshold (e.g., an RSSI in the lowest 20%).

The full-duplex communications at 604 may involve the first UE communicating directly with the second UE via various sidelink channels. In aspects, the communications at 604 may involve the first UE receiving from and transmitting to the second UE various signals simultaneously. For example, the first UE may receive, from the second UE, one or more first signals at one or more first frequency locations and at one or more first reception occasions based on the one or more resource assignments. The first UE may transmit, to the second UE, one or more second signals at one or more second frequency locations and at one or more second occasions, where at least one of the one or more first reception occasions overlaps with the one or more second occasions.

In certain aspects, the first and second frequency locations may refer to specific resource blocks at which respective sub-channels begin or end, such as a first sub-channel beginning at the first frequency location, and a second sub-channel beginning at the second frequency location. The first UE may receive the first signals via the first sub-channel and transmit the second signals via the second sub-channel. The first sub-channel may or may not overlap with the second sub-channel.

In certain aspects, the information may explicitly or implicitly indicate frequency resources that can and/or cannot be used for full-duplex transmissions from the first UE to the second UE. As an example of an implicit indication, the first UE may identify the one or more second frequency locations based on the one or more resource assignments. For example, the first UE may be aware of a guard band separating the resource assignments and the frequency resources available for transmission to the second UE. In other words, a guard band may separate the resource assignments and the frequency resources that can be used for full-duplex transmission from the first UE to the second UE. An implicit indication of the resources available for full-duplex transmissions may be based on capability information of the second UE sent to the second UE or a specific frequency offset obtained by the second UE. For example, the first UE may be able to derive the guard band from the capability information. In aspects, the frequency offset and/or capability information may be indicative of the guard band. The first UE may identify the second frequency locations based on the guard band and the resource assignments. The first UE may transmit the one or more second signals based on the identified one or more second frequency locations.

As an example of an explicit indication, the information at 602 may include an indication of one or more first frequency resources that can or cannot be used for full-duplex transmissions from the first UE to the second UE. The first UE may transmit one or more signals to the second UE via the first frequency resources indicated in the information. In certain cases, the indication may include a frequency offset relative to a reference frequency. The reference frequency may be associated with one or more second frequency resources indicated in the one or more resource assignments.

In certain aspects, the frequency resources that can or cannot be used for full-duplex transmissions may be valid for a specific duration, for example, as described herein with respect to the operations 500. In aspects, the transmission of signals at 602 may occur during a time period, where the time period may be associated with the resource assignments.

As an example of an explicit indication of frequency resources to exclude from full-duplex communications, the information may include an indication of one or more first frequency resources that cannot be used for full-duplex transmissions from the first UE to the second UE. The first UE may transmit one or more signals to the second UE via one or more second frequency resources that are different from the one or more first frequency resources.

In certain aspects, the frequency resources that can be used for full-duplex transmissions from the first UE to the second UE may be pre-configured or indicated via various explicit signaling, such as capability information of the second UE, dynamic signaling, or semi-static signaling. As an example, the first UE may obtain a configuration indicating one or more frequency resources that can or cannot be used for full-duplex transmissions from the first UE to the second UE. In aspects, the configuration may be explicit frequency resources or locations or a frequency offset relative to a reference frequency, such as the resource assignments. At 604, the first UE may transmit one or more signals to the second UE via the one or more frequency resources.

In certain cases, the second UE may provide separate signaling, dynamic or semi-static signaling, to the first UE that indicates the frequency resources that can or cannot be used for full-duplex transmissions from the second UE to the first UE. For example, the first UE may receive, from the second UE, an indication of a frequency offset, where the frequency offset indicates one or more first frequency resources that can be used for full-duplex transmissions from the first UE to the second UE relative to a reference frequency such that the first frequency resources are spaced from the reference frequency by the frequency offset. At 604, the first UE transmit one or more signals to the second UE via the one or more first frequency resources. In certain aspects, the reference frequency may be associated with one or more second frequency resources indicated in the resource assignments.

In certain cases, the second UE may provide capability information to the first UE that indicates the frequency resources that can or cannot be used for full-duplex transmissions from the first UE to the second UE. For example, the first UE may receive, from the second UE, an indication of a full-duplex capability of the second UE, where the full-duplex capability indicates of one or more frequency resources that can be used for full-duplex transmissions from the first UE to the second UE. At 604, the first UE may transmit one or more signals to the second UE via the frequency resources indicated by the capability information of the second UE. For example, the full-duplex capability may include one or more antennas available for full-duplex communications, such as a specific number of receive antennas.

In certain aspects, the information received at 602 may be conveyed via various sidelink messages, such as sidelink system information, RRC signaling, SCI, or MAC signaling. The various messages (such as capability information, dynamic signaling, or semi-static signaling of the frequency offset or explicit indication of the resources available for full-duplex transmissions) received by the first UE may be indicated directly from the second UE or indirectly from a base station. For example, the various messages may be received by the first UE via DCI, SCI, RRC signaling, MAC signaling, and/or system information from a UE (e.g., the second UE) or a base station (e.g., the BS 110*a* or 110*b*).

Figure 7:
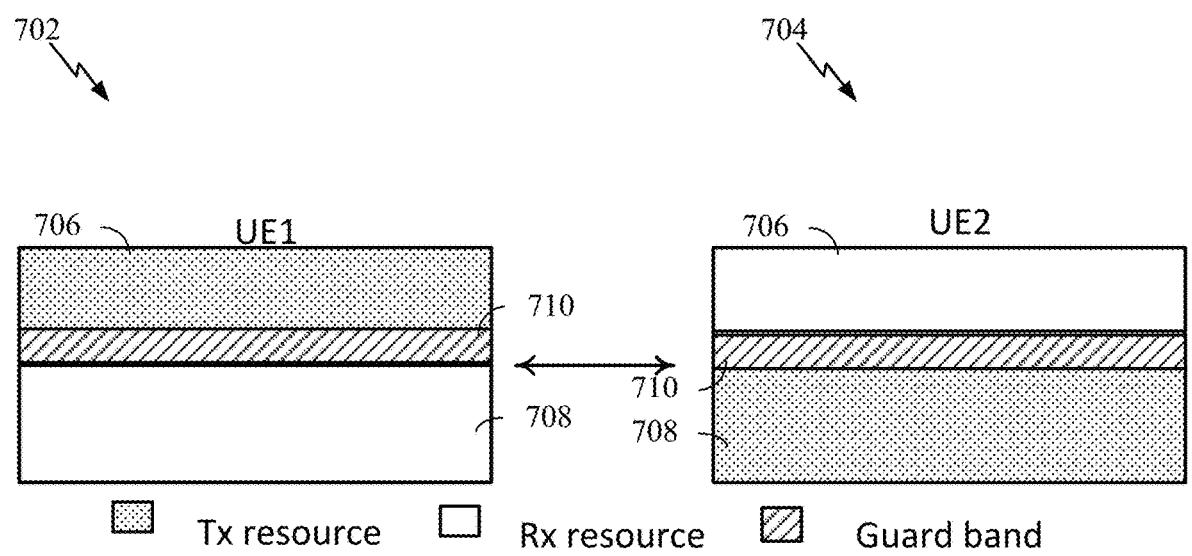
FIG. 7 is a diagram illustrating example frequency resource grids available for full-duplex communications, in accordance with certain aspects of the present disclosure.

FIG. 7 is a diagram illustrating example frequency resource grids 702, 704 available for full-duplex communications, in accordance with certain aspects of the present disclosure. As used herein, a frequency resource grid may refer to a collection of frequency resources within one or more BWPs of a carrier or within one or more carriers. As shown, a first resource grid 700A may be allocated to the first UE of the operations 500, and a second resource grid 700B may be allocated to the second UE of the operations 500. The first resource grid 700A may include first frequency resources 706, second frequency resources 708, and a guard band 710. The first frequency resources 706 may be allocated for transmission by the first UE, and the second frequency resources 708 may be allocated for reception by the first UE. The guard band 710 may separate the first frequency resources 706 and the second frequency resource 708. In aspects, the first frequency resources 706, second frequency resources 708, or guard band 710 may include one or more resource blocks in a carrier, one or more sub-channels in a carrier, one or more BWPs in a carrier, or one or more carriers. In this example, the second resource grid 700B may be complementary to the first resource grid 700A, such that the first frequency resources 706 may be allocated for reception by the second UE, and the second frequency resource 708 may be allocated for transmission by the second UE.

In certain cases, the resource assignment sent from the first UE to the second UE (for example, at 502) may indicate the first frequency resources 706 without an explicit indication of the second frequency resources 708, such that the second UE may identify the second frequency resources 708 for full-duplex transmission based on the various techniques described herein with respect to the operations 500 and 600. In certain cases, the resource assignment sent from the first UE to the second UE may explicitly indicate the second frequency resources 708, for example, via a frequency offset or as specific frequency resources. In certain cases, the second UE may receive an indication of the guard band 710 via capability information of the first UE, dynamic signaling (e.g., SCI or DCI), or semi-static signaling (e.g., RRC signaling, MAC signaling, or system information).

Those of skill in the art will understand that the transmit/receive frequency resources and guard band illustrated in FIG. 7 are exemplary only. Additional transmit/receive frequency resources and/or guard bands may be used in addition to or instead of those illustrated.

Figure 8:
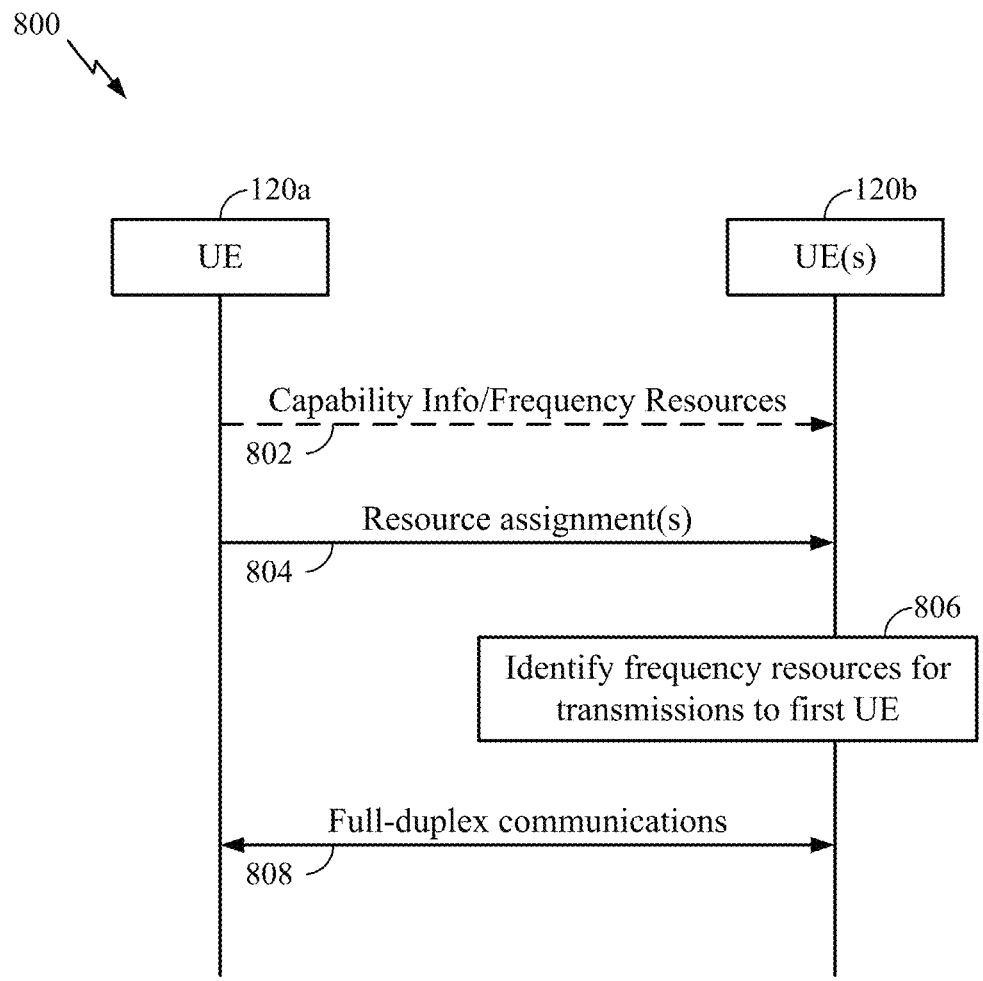
FIG. 8 is a signal flow diagram illustrating example signaling for allocating frequency resources for full-duplex sidelink communications, in accordance with aspects of the present disclosure.

FIG. 8 is a signaling flow diagram illustrating example signaling for allocating frequency resources for full-duplex sidelink communications, in accordance with aspects of the present disclosure. As shown, at 802, a first UE 120*a* may transmit, to a second UE 120*b*, an indication of frequency resources that can or cannot be used for full-duplex transmissions to the first UE 120*a* from the second UE 120*b*. In certain aspects, the indication at 802 may be capability information, an explicit indication of the frequency resources, or one or more frequency offsets, which can be used to derive the frequency resources from a resource assignment or other reference frequency. The indication at 802 may be transmitted via SCI, RRC signaling, MAC signaling, and/or system information. Additionally or alternatively, the second UE 120*b* may receive the indication at 802 from a base station (e.g., the BS 110*a* or BS 110*b*), for example, via DCI, RRC signaling, MAC signaling, and/or system information.

At 804, the first UE 120*a* may transmit, to the second UE 120*b*, information (e.g., SCI) indicating one or more resource assignments for one or more transmissions to the second UE. In certain cases, the information at 804 may include an indication of the first frequency resources 706 of FIG. 7. In certain cases, the information at 804 may include an explicit indication of the second frequency resources 708. For example, the information may include a frequency offset used to derive the second frequency resources 708 from the first frequency resources 706 or another reference frequency. In certain cases, the information may explicitly identify the second frequency resources 708.

At 806, the second UE 120*b* may identify frequency resources for transmission to the first UE 120*b*. In certain cases, the second UE 120*b* may identify the frequency resources for transmission to the first UE 120*b* based on the information received at 804 and/or the indication received at 802. In aspects, the second UE 120*b* may identify the frequency resources for transmission based on the channel quality of resources in a resource pool. For example, the second UE 120*b* may select the resources with the best channel quality (e.g., a specific number or percentage of lowest RSSI or CBR) that overlap with the frequency resources available for full-duplex transmission to the first UE 120*a*.

At 808, the first UE 120*a* may communicate with the second UE 120*b* in a full-duplex manner using the frequency resources available for full-duplex transmission.

While the examples provided herein are described with respect to a first UE (e.g., the UE 120*a*) communicating directly with a second UE (e.g., the UE 120*b*), aspects of the present disclosure may also be applied to the first UE 120*a* communicating directly with multiple second UEs 120*b*, for example, via sidelink channels.

Figure 9:
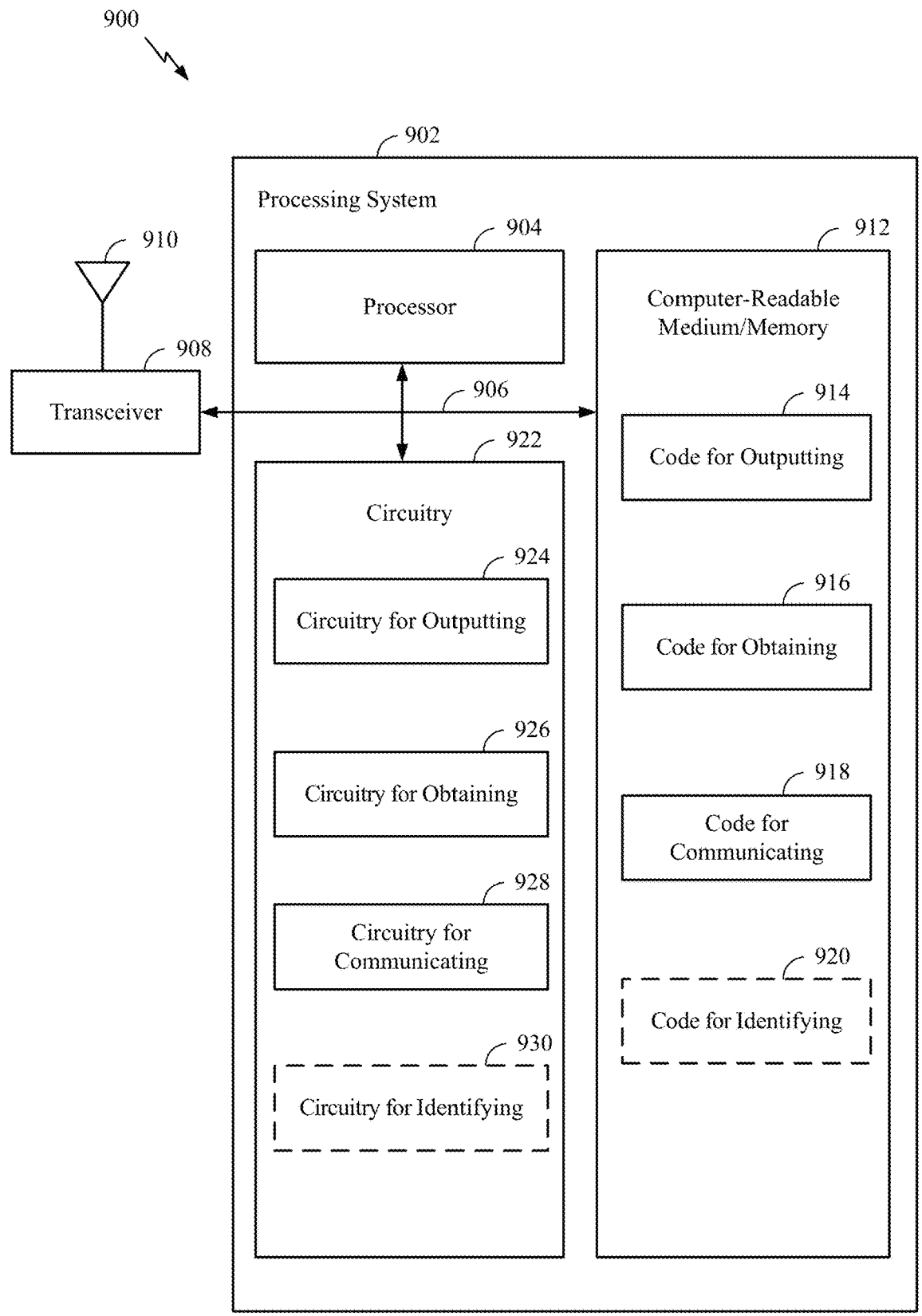
FIG. 9 illustrates a communications device (e.g., a UE or V2X device) that may include various components configured to perform operations for the techniques disclosed herein in accordance with aspects of the present disclosure.

FIG. 9 illustrates a communications device 900 (e.g., a UE or V2X device) that may include various components (e.g., corresponding to means-plus-function components) configured to perform operations for the techniques disclosed herein, such as the operations illustrated in FIG. 5 and/or FIG. 6. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 5 and/or FIG. 6, or other operations for performing the various techniques discussed herein for sub-band full-duplex resource management. In certain aspects, computer-readable medium/memory 912 stores code for outputting (e.g., transmitting or providing) 914, code for obtaining (e.g., receiving) 916, code for communicating 918, and/or code for identifying 920. In certain aspects, the processing system 902 has circuitry 922 configured to implement the code stored in the computer-readable medium/memory 912. In certain aspects, the circuitry 922 is coupled to the processor 904 and/or the computer-readable medium/memory 912 via the bus 906. For example, the circuitry 922 includes circuitry for outputting 924, circuitry for obtaining 926, circuitry for communicating 928, and/or circuitry for identifying 930.

EXAMPLE ASPECTS

Aspect 1: A method of wireless communications by a first user equipment (UE), comprising: transmitting, to a second UE, information indicating one or more resource assignments for one or more transmissions to the second UE; and communicating with the second UE in a full-duplex manner based on the one or more resource assignments.

Aspect 2: The method of Aspect 1, wherein the communication with the second UE comprises: receiving, from the second UE, one or more first signals at one or more first frequency locations and at one or more first reception occasions; and transmitting, to the second UE, one or more second signals at one or more second frequency locations and at one or more second transmission occasions, wherein at least one of the one or more first reception occasions overlaps with the one or more second transmission occasions.

Aspect 3: The method of any one of Aspects 1-2, wherein: the information includes an indication of one or more first frequency resources that can be used for full-duplex transmissions from the second UE to the first UE; and the communication with the second UE comprises receiving one or more signals from the second UE via the indicated one or more first frequency resources.

Aspect 4: The method of Aspect 3, wherein the indication of the one or more first frequency resources comprises a frequency offset relative to a reference frequency.

Aspect 5: The method of Aspect 4, wherein the reference frequency is associated with one or more second frequency resources indicated in the one or more resource assignments.

Aspect 6: The method of Aspect 3, wherein the reception occurs during a time period.

Aspect 7: The method of Aspect 6, wherein the time period is associated with the one or more resource assignments.

Aspect 8: The method of Aspect 3, wherein a guard band separates the one or more first frequency resources from the one or more resource assignments.

Aspect 9: The method of Aspect 3, further comprising: identifying the one or more first frequency resources based on at least one of a full-duplex capability of the first UE or a channel quality associated with a plurality of frequency resources including the one or more first frequency resources, wherein the transmission of the information comprises transmitting the information based on the identified one or more first frequency resources.

Aspect 10: The method of any one of Aspects 1-9, wherein: the information includes an indication of one or more first frequency resources that cannot be used for full-duplex transmissions from the second UE to the first UE; and the communication with the second UE comprises receiving one or more signals from the second UE via one or more second frequency resources that are different from the one or more first frequency resources.

Aspect 11: The method of any one of Aspects 1-10, further comprising: obtaining a configuration indicating one or more frequency resources that can be used for full-duplex transmissions from the second UE to the first UE, wherein the communication with the second UE comprises receiving one or more signals from the second UE via the one or more frequency resources.

Aspect 12: The method of any one of Aspects 1-11, further comprising: transmitting, to the second UE, an indication of a frequency offset, wherein the frequency offset indicates one or more first frequency resources that can be used for full-duplex transmissions from the second UE to the first UE relative to a reference frequency such that the one or more first frequency resources are spaced from the reference frequency by the frequency offset, wherein the communication with the second UE comprises receiving one or more signals from the second UE via the one or more first frequency resources.

Aspect 13: The method of Aspect 12, wherein the reference frequency is associated with one or more second frequency resources indicated in the one or more resource assignments.

Aspect 14: The method of any one of Aspects 1-13, further comprising: transmitting, to the second UE, an indication of a full-duplex capability of the first UE, wherein the full-duplex capability indicates one or more frequency resources that can be used for full-duplex transmissions from the second UE to the first UE, wherein the communication with the second UE comprises receiving one or more signals from the second UE via the one or more frequency resources.

Aspect 15: The method of Aspect 14, wherein the full-duplex capability includes one or more antennas available for full-duplex communications.

Aspect 16: The method according to any one of Aspects 1-15, wherein the information comprises sidelink control information (SCI).

Aspect 17: A method of wireless communications by a first user equipment (UE), comprising: receiving, from a second UE, information indicating one or more resource assignments for one or more transmissions from the second UE; and communicating with the second UE in a full-duplex manner based on the one or more resource assignments.

Aspect 18: The method of Aspect 17, further comprising: identifying one or more frequency resources that can be used for full-duplex transmissions from the first UE to the second UE based on at least one of the one or more resource assignments or a channel quality associated with the one or more frequency resources, wherein the communication with the second UE comprises transmitting one or more signals to the second UE via the one or more frequency resources.

Aspect 19: The method of Aspect 18, wherein the identification of the one or more frequency resources comprises identifying the one or more frequency resources having the channel quality less than or equal to a threshold.

Aspect 20: The method of any one of Aspects 17-19, wherein the communication with the second UE comprises: receiving, from the second UE, one or more first signals at one or more first frequency locations and at one or more first reception occasions based on the one or more resource assignments; and transmitting, to the second UE, one or more second signals at one or more second frequency locations and at one or more second occasions, wherein at least one of the one or more first reception occasions overlaps with the one or more second occasions.

Aspect 21: The method of Aspect 20, further comprising: identifying the one or more second frequency locations based on the one or more resource assignments, wherein the transmission of the one or more second signals comprises transmitting the one or more second signals based on the identified one or more second frequency locations.

Aspect 22: The method of any one of Aspects 17-21, wherein: the information includes an indication of one or more first frequency resources that can be used for full-duplex transmissions from the first UE to the second UE, wherein the communication with the second UE comprises transmitting one or more signals to the second UE via the one or more first frequency resources.

Aspect 23: The method of Aspect 22, wherein the indication of the one or more first frequency resources comprises a frequency offset relative to a reference frequency.

Aspect 24: The method of Aspect 23, wherein the reference frequency is associated with one or more second frequency resources indicated in the one or more resource assignments.

Aspect 25: The method of Aspect 22, wherein the transmission of the one or more signals occurs during a time period.

Aspect 26: The method of Aspect 25, wherein the time period is associated with the one or more resource assignments.

Aspect 27: The method of Aspect 22, wherein a guard band separates the one or more first frequency resources from the one or more resource assignments.

Aspect 28: The method of any one of Aspects 17-27, wherein: the information includes an indication of one or more first frequency resources that cannot be used for full-duplex transmissions from the first UE to the second UE; and the communication with the second UE comprises transmitting one or more signals to the second UE via one or more second frequency resources that are different from the one or more first frequency resources.

Aspect 29: The method of any one of Aspects 17-28, further comprising: obtaining a configuration indicating one or more frequency resources that can be used for full-duplex transmissions from the first UE to the second UE; wherein the communication with the second UE comprises transmitting one or more signals to the second UE via the one or more frequency resources.

Aspect 30: The method of any one of Aspects 17-29, further comprising: receiving, from the second UE, an indication of a frequency offset, wherein the frequency offset indicates one or more first frequency resources that can be used for full-duplex transmissions from the first UE to the second UE relative to a reference frequency such that the one or more first frequency resources are spaced from the reference frequency by the frequency offset; and wherein the communication with the second UE comprises transmitting one or more signals to the second UE via the one or more first frequency resources.

Aspect 31: The method of Aspect 30, wherein the reference frequency is associated with one or more second frequency resources indicated in the one or more resource assignments.

Aspect 32: The method of any one of Aspects 17-31, further comprising: receiving, from the second UE, an indication of a full-duplex capability of the second UE, wherein the full-duplex capability indicates of one or more frequency resources that can be used for full-duplex transmissions from the first UE to the second UE; and wherein the communication with the second UE comprises transmitting one or more signals to the second UE via the one or more frequency resources.

Aspect 33: The method of Aspect 32, wherein the full-duplex capability includes one or more antennas available for full-duplex communications.

Aspect 34: The method according to any one of Aspects 17-33, wherein the information comprises sidelink control information (SCI).

Aspect 35: A first user equipment, comprising means for performing the operations of one or more of Aspects 1-16.

Aspect 36: A first user equipment, comprising a transceiver and a processing system including at least one processor configured to perform the operations of one or more of Aspects 1-16.

Aspect 37: A first user equipment, comprising means for performing the operations of one or more of Aspects 17-34.

Aspect 38: A first user equipment, comprising a transceiver and a processing system including at least one processor configured to perform the operations of one or more of Aspects 17-34.

Aspect 39: An apparatus for wireless communications by a first user equipment (UE), comprising: an interface configured to, output for transmission a second UE, information indicating one or more resource assignments for one or more transmissions to the second UE; and a processing system configured to communicate with the second UE in a full-duplex manner based on the one or more resource assignments.

Aspect 40: An apparatus for wireless communications by a first user equipment (UE), comprising: an interface configured to obtain, from a second UE, information indicating one or more resource assignments for one or more transmissions from the second UE; and a processing system configured to communicate with the second UE in a full-duplex manner based on the one or more resource assignments.

Aspect 41: A computer-readable medium for wireless communications by a first user equipment (UE), comprising codes executable to: output, for transmission a second UE, information indicating one or more resource assignments for one or more transmissions to the second UE; and communicate with the second UE in a full-duplex manner based on the one or more resource assignments.

Aspect 42: A computer-readable medium for wireless communications by a first user equipment (UE), comprising codes executable to: obtain, from a second UE, information indicating one or more resource assignments for one or more transmissions from the second UE; and communicate with the second UE in a full-duplex manner based on the one or more resource assignments.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. ABS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices. In addition, the wireless node can be a BS or UE.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120a and/or processors 220, 230, 238, and/or controller/processor 240 of the BS 110a shown in FIG. 2 may be configured to perform one or more operations 500 of FIG. 5 and/or one or more operations 600 of FIG. 6.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for communicating, means for identifying, and means obtaining may include a processing system, which may include one or more processors, such as processors 258, 264 and 266, and/or controller/processor 280 of the UE 120a and/or processors 220, 230, 238, and/or controller/processor 240 of the BS 110a shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5 and/or FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation, and details of the methods and apparatus described above without departing from the scope of the claims.

The invention claimed is:

1. A method of wireless communications by a first user equipment (UE), comprising:
   transmitting, to a second UE, information indicating one or more resource assignments for one or more transmissions to the second UE, wherein the information includes an indication of one or more first frequency resources that can be used for full-duplex transmissions from the second UE to the first UE; and
   communicating with the second UE in a full-duplex manner based on the one or more resource assignments,
   wherein the method further comprises transmitting, to the second UE, an indication of a frequency offset, wherein the frequency offset indicates the one or more first frequency resources that can be used for the full-duplex transmissions from the second UE to the first UE relative to a reference frequency such that the one or more first frequency resources are spaced from the reference frequency by the frequency offset, and
   wherein the communicating with the second UE comprises receiving one or more signals from the second UE via the one or more first frequency resources.

2. The method of claim 1, wherein the reference frequency is associated with one or more second frequency resources indicated in the one or more resource assignments.

3. A method of wireless communications by a first user equipment (UE), comprising:
   receiving, from a second UE, information indicating one or more resource assignments for one or more transmissions from the second UE, wherein the information includes an indication of one or more first frequency resources that can be used for full-duplex transmissions from the first UE to the second UE; and
   communicating with the second UE in a full-duplex manner based on the one or more resource assignments,
   wherein the method further comprises receiving, from the second UE, an indication of a frequency offset, wherein the frequency offset indicates the one or more first frequency resources that can be used for the full-duplex transmissions from the first UE to the second UE relative to a reference frequency such that the one or more first frequency resources are spaced from the reference frequency by the frequency offset; and
   wherein the communicating with the second UE comprises transmitting one or more signals to the second UE via the one or more first frequency resources.

4. The method of claim 3, wherein the reference frequency is associated with one or more second frequency resources indicated in the one or more resource assignments.

5. A first user equipment (UE), comprising:
   one or more memories comprising instructions; and
   one or more processors configured to execute the instructions and cause the first UE to:
      transmit, to a second UE, information indicating one or more resource assignments for one or more transmissions to the second UE, wherein the information includes an indication of one or more first frequency resources that can be used for full-duplex transmissions from the second UE to the first UE; and
      communicate with the second UE in a full-duplex manner based on the one or more resource assignments,
   wherein the one or more processors are further configured to execute the instructions and cause the first UE to transmit, to the second UE, an indication of a frequency offset, wherein the frequency offset indicates the one or more first frequency resources that can be used for the full-duplex transmissions from the second UE to the first UE relative to a reference frequency such that the one or more first frequency resources are spaced from the reference frequency by the frequency offset, and
   wherein, to communicate with the second UE, the one or more processors are configured to execute the instructions and cause the first UE to receive one or more signals from the second UE via the one or more first frequency resources.

6. The first UE of claim 5, wherein, to communicate with the second UE, the one or more processors are configured to execute the instructions and cause the first UE to:
   receive, from the second UE, the one or more first signals at one or more first frequency locations and at one or more first reception occasions; and
   transmit, to the second UE, one or more second signals at one or more second frequency locations and at one or more second transmission occasions, wherein at least one of the one or more first reception occasions overlaps with the one or more second transmission occasions.

7. The first UE of claim 5, wherein the indication of the one or more first frequency resources comprises a second frequency offset relative to a second reference frequency that is associated with one or more second frequency resources indicated in the one or more resource assignments.

8. The first UE of claim 7, wherein the second frequency offset is the frequency offset, and the second reference frequency is the reference frequency.

9. The first UE of claim 5, wherein the one or more processors are further configured to execute the instructions and cause the first UE to receive the one or more signals from the second UE during a time period that is associated with the one or more resource assignments.

10. The first UE of claim 5, wherein a guard band separates the one or more first frequency resources from the one or more resource assignments.

11. The first UE of claim 7, wherein:
   the one or more processors are configured to execute the instructions and cause the first UE to identify the one or more first frequency resources based on at least one of a full-duplex capability of the first UE or a channel quality associated with a plurality of frequency resources including the one or more first frequency resources,
   to transmit the information, the one or more processors are configured to execute the instructions and cause the first UE to transmit the information based on the identified one or more first frequency resources.

12. The first UE of claim 5, wherein:
   the information includes an indication of one or more second frequency resources that cannot be used for the full-duplex transmissions from the second UE to the first UE; and to communicate with the second UE, the one or more processors are configured to execute the instructions and cause the first UE to receive signals from the second UE via one or more third frequency resources that are different from the one or more second frequency resources.

13. The first UE of claim 5, wherein:
the one or more processors are further configured to execute the instructions and cause the first UE to obtain a configuration indicating one or more frequency resources that can be used for the full-duplex transmissions from the second UE to the first UE,
to communicate with the second UE, the one or more processors are configured to execute the instructions and cause the first UE to receive one or more signals from the second UE via the indicated one or more frequency resources.

14. The first UE of claim 5, wherein the reference frequency is associated with one or more second frequency resources indicated in the one or more resource assignments.

15. The first UE of claim 5, wherein:
the one or more processors are further configured to execute the instructions and cause the first UE to transmit, to the second UE, an indication of a full-duplex capability of the first UE, wherein the full-duplex capability indicates one or more frequency resources that can be used for the full-duplex transmissions from the second UE to the first UE; and
to communicate with the second UE, the one or more processors are configured to execute the instructions and cause the first UE to transmit one or more signals to the second UE via the indicated one or more frequency resources.

16. A first user equipment (UE), comprising:
one or more memories comprising instructions; and
one or more processors configured to execute the instructions and cause the first UE to:
receive, from a second UE, information indicating one or more resource assignments for one or more transmissions from the second UE, wherein the information includes an indication of one or more first frequency resources that can be used for full-duplex transmissions from the first UE to the second UE; and
communicate with the second UE in a full-duplex manner based on the one or more resource assignments,
wherein the one or more processors are further configured to execute the instructions and cause the first UE to receive, from the second UE, an indication of a frequency offset, wherein the frequency offset indicates the one or more first frequency resources that can be used for the full-duplex transmissions from the first UE to the second UE relative to a reference frequency such that the one or more first frequency resources are spaced from the reference frequency by the frequency offset, and
wherein, to communicate with the second UE, the one or more processors are configured to execute the instructions and cause the first UE to transmit one or more signals to the second UE via the one or more first frequency resources.

17. The first UE of claim 16, wherein:
the one or more processors are further configured to execute the instructions and cause the first UE to identify one or more frequency resources that can be used for the full-duplex transmissions from the first UE to the second UE based on at least one of the one or more resource assignments or a channel quality associated with the one or more frequency resources, and
to communicate with the second UE, the one or more processors are configured to execute the instructions and cause the first UE to transmit one or more signals to the second UE via the identified one or more frequency resources.

18. The first UE of claim 17, wherein to identify of the one or more frequency resources, the one or more processors are configured to execute the instructions and cause the first UE to identify the one or more frequency resources having the channel quality less than or equal to a threshold.

19. The first UE of claim 16, wherein, to communicate with the second UE, the one or more processors are configured to execute the instructions and cause the first UE to:
receive, from the second UE, one or more first signals at one or more first frequency locations and at one or more first reception occasions based on the one or more resource assignments; and
transmit, to the second UE, one or more second signals at one or more second frequency locations and at one or more second occasions, wherein at least one of the one or more first reception occasions overlaps with the one or more second occasions.

20. The first UE of claim 19, wherein:
the one or more processors are further configured to execute the instructions and cause the first UE to identify the one or more second frequency locations based on the one or more resource assignments,
to transmit the one or more second signals, the one or more processors are configured to execute the instructions and cause the first UE to transmit the one or more second signals based on the identified one or more second frequency locations.

21. The first UE of claim 16, wherein the indication of the one or more first frequency resources comprises a second frequency offset relative to a second reference frequency that is associated with one or more second frequency resources indicated in the one or more resource assignments.

22. The first UE of claim 21, wherein the second frequency offset is the frequency offset, and the second reference frequency is the reference frequency.

23. The first UE of claim 16, wherein the one or more processors are configured to execute the instructions and cause the first UE to transmit the one or more signals during a time period that is associated with the one or more resource assignments.

24. The first UE of claim 16, wherein a guard band separates the one or more first frequency resources from the one or more resource assignments.

25. The first UE of claim 16, wherein:
the information includes an indication of one or more second frequency resources that cannot be used for the full-duplex transmissions from the first UE to the second UE; and
to communicate with the second UE, the one or more processors are configured to execute the instructions and cause the first UE to transmit signals to the second UE via one or more third frequency resources that are different from the one or more second frequency resources.

26. The first UE of claim 16, wherein:
the one or more processors are further configured to execute the instructions and cause the first UE to obtain a configuration indicating one or more frequency resources that can be used for the full-duplex transmissions from the first UE to the second UE; and to communicate with the second UE, the one or more processors are configured to execute the instructions and cause the first UE to transmit one or more signals to the second UE via the indicated one or more frequency resources.

27. The first UE of claim 16, wherein the reference frequency is associated with one or more second frequency resources indicated in the one or more resource assignments.

28. The first UE of claim 16, wherein:

the one or more processors are further configured to execute the instructions and cause the first UE to receive, from the second UE, an indication of a full-duplex capability of the second UE, wherein the full-duplex capability indicates one or more frequency resources that can be used for the full-duplex transmissions from the first UE to the second UE; and to communicate with the second UE, the one or more processors are configured to execute the instructions and cause the first UE to transmit one or more signals to the second UE via the indicated one or more frequency resources.

* * * * *